United States Patent [19]

Yoshida

[11] Patent Number: 4,717,967
[45] Date of Patent: Jan. 5, 1988

[54] IMAGE RECORDING APPARATUS WITH RECORDING MEDIUM QUANITY DETECTING MEANS

[75] Inventor: Takehiro Yoshida, Tokyo, Japan

[73] Assignee: Canon Kabushiki Kaisha, Tokyo, Japan

[21] Appl. No.: 9,071

[22] Filed: Jan. 27, 1987

Related U.S. Application Data

[63] Continuation of Ser. No. 702,681, Feb. 9, 1985, abandoned.

[30] Foreign Application Priority Data

Feb. 24, 1984 [JP] Japan .................................. 59-32599
Mar. 2, 1984 [JP] Japan .................................. 59-38643
Apr. 26, 1984 [JP] Japan .................................. 59-83021

[51] Int. Cl.$^4$ .......................... H04N 1/21; H04N 1/23; H04N 1/40; G06F 15/40
[52] U.S. Cl. .................................... 358/296; 358/280; 178/23 R; 364/518
[58] Field of Search ............... 358/296, 300, 304, 280, 358/287, 288, 293, 294; 364/518, 519, 523; 178/23 R, 24, 25, 26 R; 346/134

[56] References Cited

U.S. PATENT DOCUMENTS 4,063,029 12/1977 Elstner ......................... 178/23 R X
4,198,680 4/1980 Gray, Jr. .............................. 364/518
4,491,874 1/1985 Yamamoto ....................... 364/518 X
4,521,805 6/1985 Ayata et al. ...................... 358/296 X

FOREIGN PATENT DOCUMENTS 15554 1/1982 Japan ................................. 178/23 R
97765 6/1982 Japan ................................. 358/296
2128843 5/1984 United Kingdom ................ 358/280

OTHER PUBLICATIONS

Martin, V. C., "Page Assembler", *IBM Technical Disclosure Bulletin*, vol. 5, No. 8, (Jan. 1963), pp. 25-26.
Sennesh, W. A., *CPT 8500 Series Reference Manual*, Apr. 1983, pp. 4-11, 6-18-24.

*Primary Examiner*—E. A. Goldberg
*Assistant Examiner*—Patrick W. Foster
*Attorney, Agent, or Firm*—Fitzpatrick, Cella, Harper & Scinto

[57] ABSTRACT

An image recording apparatus such as a facsimile apparatus has a recorder, a control circuit, a display circuit, a sensor for detecting a quantity of remaining recording paper, and an auxiliary memory for storing data which has been received but not yet recorded due to short supply of recording paper. When image information is recorded in a divided manner or recording of image information is interrupted during reception of such information, this state can be displayed.

13 Claims, 12 Drawing Figures

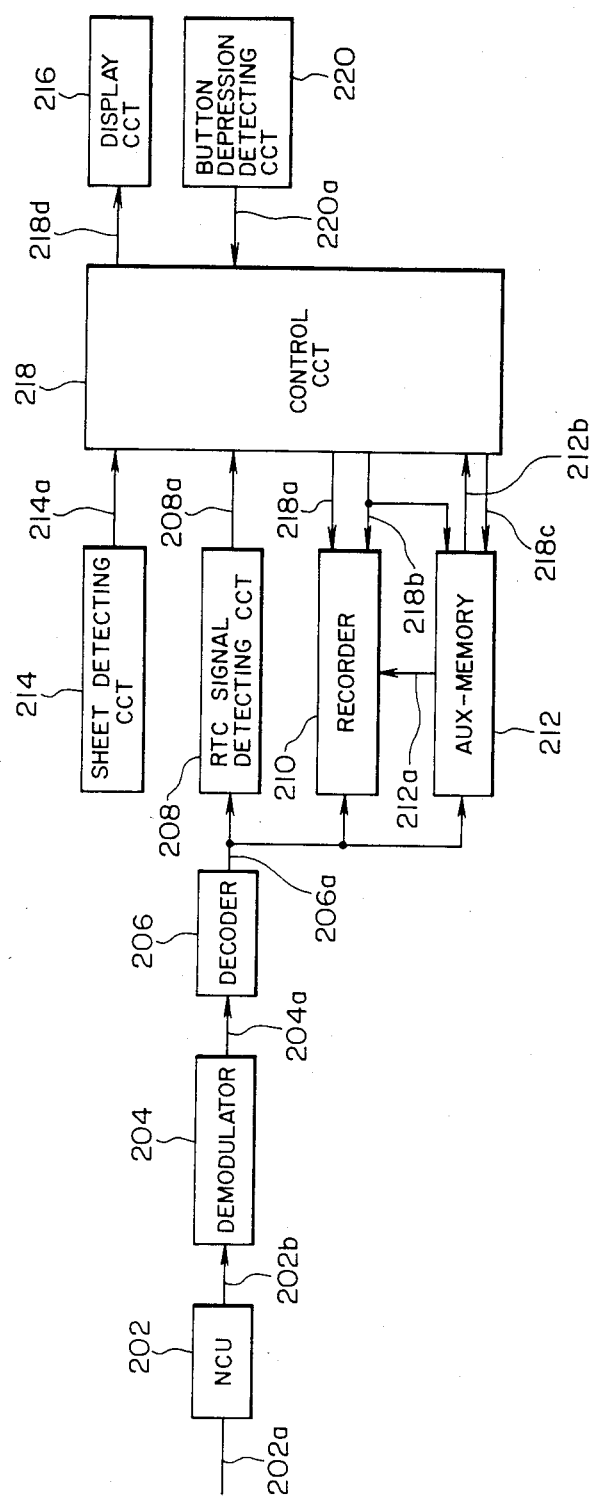

IMAGE RECORDING APPARATUS WITH RECORDING MEDIUM QUANTITY DETECTING MEANS

This application is a continuation, of application Ser. No. 702,681, filed Feb. 9, 1985, now abandoned.

BACKGROUND OF THE INVENTION

1. Field of the Invention

The present invention relates to an apparatus for recording image information such as a facsimile system or a printer.

2. Description of the Prior Art

Various types of recording paper are conventionally used in recording apparatuses such as a facsimile system or a printer. However, recording paper is roughly classified into roll paper and cut paper. In a recording apparatus using roll paper, the length of image information to be recorded is not limited, and an elongated original can be sent. However, in an apparatus using cut paper, the size of image information is limited by the size of the recording paper used.

When image information is sent to a receiver having a particular maximum size of recording paper which can be used, as image information of a maximum scanning line number determined by the recording paper size of the receiver is sent, a predetermined signal is sent to designate the end of each page so as to record information from the next scanning line at the top of the next page.

Since the maximum scanning line number is determined by the recording paper size of a receiver independently of the size of an original to be sent, if image information of the original is not of a standard format, image information may be appropriately divided and so recorded on a plurality of cut paper sheets.

In such a case, it is difficult to determine if the recorded image information corresponds to part of an elongated original or to a single original. When an attempt is made to combine and reproduce image information of an elongated original recorded in a divided manner, the connecting portions are difficult to determine.

When image information of one page is received, if a predetermined quantity of recording paper does not remain available for use, communication is terminated by an error indication without sending back a reception preparation end signal for the next original. In such a case, the operator at the sending end must confirm if communication has been interrupted and there are still more originals to be sent.

The above conditions also apply to a facsimile system using roll paper. When the remaining quantity of recording paper reaches a predetermined value, communication is terminated with an error indication.

When an information boundary happens to coincide with a terminated portion of information, the operator at the receiving end may mistakenly believe that all image information has been sent.

In this manner, an error indication provided upon communication termination due to shortage (absence) of recording paper can indicate only that an error has occurred or that paper must be replenished. When such an error indication is provided, the operator at the receiving end must contact the sending end by telephone or the like and inquire if all the image information has been sent.

In a recording apparatus as described above, when recording paper runs out, normal recording cannot be performed. For this reason, shortage of recording paper has conventionally been detected by the following methods.

According to the first method, the presence of recording paper at a predetermined position on a recording paper convey path is detected by means of a photointerruptor or the like. In this method, the recording operation is terminated only when there is no more recording paper. This means that reception of information being received may be abruptly interrupted.

According to the second method, it is detected if the remaining quantity of recording sheets has reached a predetermined value. For example, a mark of a predetermined length (e.g., 1 to several pages long from its end) is formed on the rear surface or side edge of recording paper, and the mark is detected by a photosensor or the like. In an apparatus adopting this method, when the mark on the recording paper is detected, an alarm sound or the like is generated to signal to the operator a need for replenishment of recording paper. With this method, information being received can continue to be received and recorded on the remaining paper. However, in such an apparatus, a reflecting photosensor is used for detecting the mark. This photosensor frequently operates erroneously due to dust or the like attached to the recording paper.

SUMMARY OF THE INVENTION

The present invention has been made in consideration of this and has as its object to provide an image recording apparatus with an improved operability.

It is another object of the present invention to provide an image recording apparatus which can easily discriminate recorded image information.

It is still another object of the present invention to provide an image recording apparatus which can reliably record received information.

It is still another object of the present invention to provide an image recording apparatus which can reliably record image information to be received.

It is still another object of the present invention to provide an image recording apparatus which can display a state wherein single image information is recorded in a divided manner.

It is still another object of the present invention to provide an image recording apparatus which terminates communication when the remaining quantity of recording paper reaches a predetermined quantity during communication and which can display that the apparatus was in process of communication/recording at the time when shortage of paper was detected.

It is still another object of the present invention to provide an image information apparatus which can store in a memory information which has been received but not recorded when the remaining quantity of recording paper reaches a predetermined quantity during communication.

According to one embodiment, the present invention resides in image recording apparatus, such as a facsimile machine, for recording an image transmitted by electronic communications. The image recording apparatus comprises first recording means for recording an image on a recording medium in accordance with input image information, detecting means for detecting that the quantity of remaining recording medium has reached a predetermined quantity, control means responsive to an output from the detecting means for interrupting a recording operation of the first recording means according to the input image information, and second recording means for recording on a recording medium specific information indicating that the recording operation of the first recording means according to the input image information is interrupted.

According to another embodiment, the present invention resides in an image processing apparatus comprising processing means for processing image information, detecting means for detecting that the image information subjected to processing by the processing means has reached a predetermined quantity, control means for controlling the processing to process the image information on a divisional basis in the event that image information remains to be processed when the detecting means detects that the predetermined quantity of image information has been processed, and output means for outputting to the processing means predetermined information indicating that the image information is processed on a divisional basis in the event that image information remains to be processed when the detecting means detects that the predetermined quantity of image information has been processed.

The above and other objects, features and advantages of the present invention will become apparent from the following description taken in conjunction with the accompanying drawings.

BRIEF DESCRIPTION OF THE DRAWINGS

FIG. 6 is a block diagram showing the configuration of a facsimile apparatus according to still another embodiment of the present invention.

DETAILED DESCRIPTION OF THE PREFERRED EMBODIMENTS

The preferred embodiments of the present invention will now be described with reference to the accompanying drawings.

Figure 1:
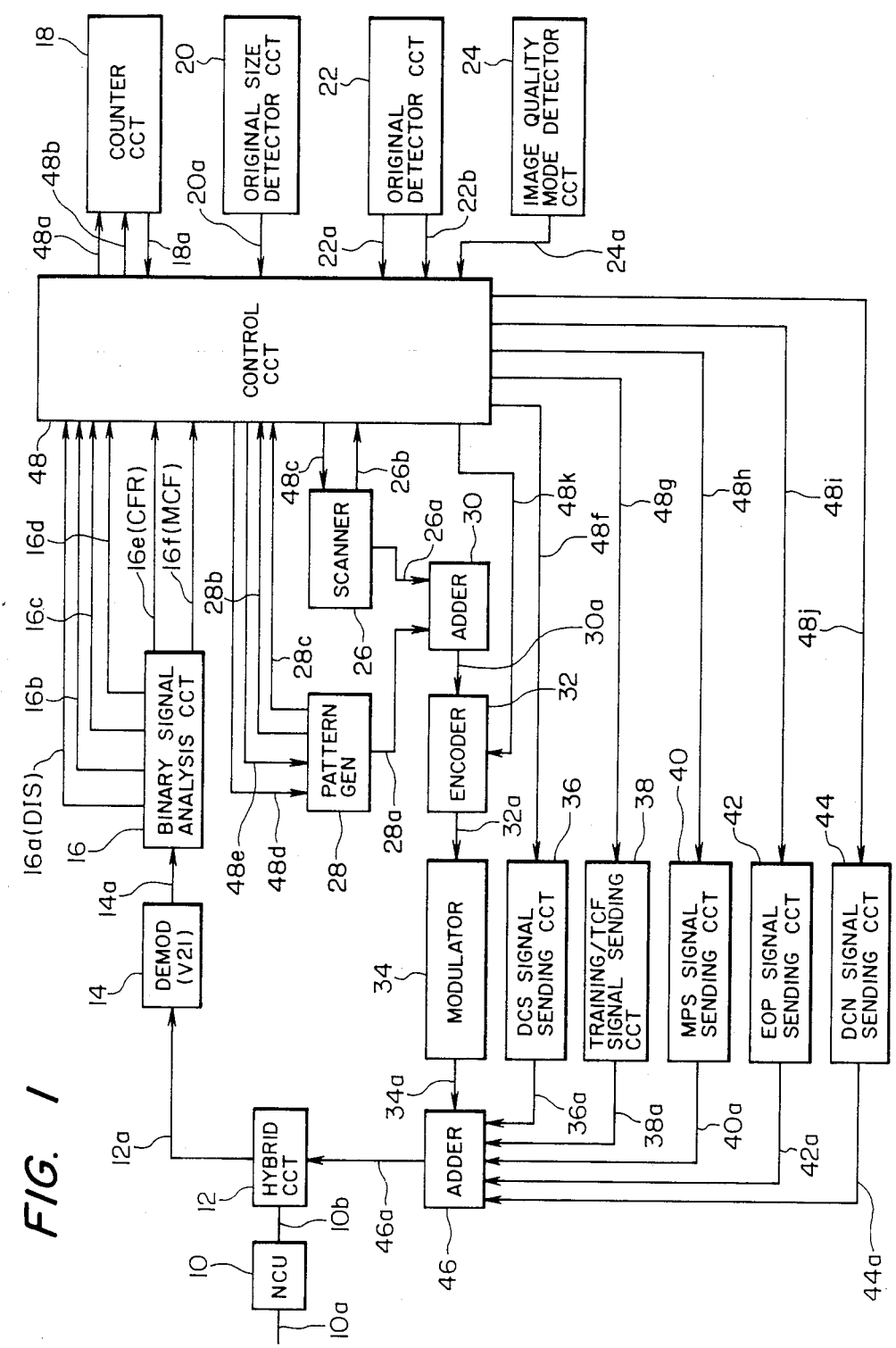
FIG. 1 is a block diagram showing the configuration of a facsimile apparatus according to an embodiment of the present invention.

FIG. 1 is a block diagram of a facsimile system according to an embodiment of the present invention.

Referring to FIG. 1, a network control unit (NCU) 10 is connected to a terminal of a line to control connection of a telephone network, to switch a data communication path, or to hold a loop, thereby utilizing the network for data communication. A telephone line 10a is connected to the NCU 10.

A hybrid circuit 12 separates a transmission signal and a reception signal. A transmission signal is sent onto the telephone line 10a through the hybrid circuit 12, a signal line 10b, and the NCU 10. A reception signal is supplied onto a signal line 12a through the signal line 10b and the hybrid circuit 12.

The reception signal on the signal line 12a is supplied to a decoder 14 and is decoded by a scheme according to Recommendation V21 of CCITT. The decoded signal is supplied to a binary signal analysis circuit 16 through a signal line 14a.

The binary signal analysis circuit 16 analyses the signal on the signal line 14a, i.e., the binary signal sent from the receiving end system according to the CCITT scheme. In a description to follow, known signals will simply be stated and a detailed description thereof will be omitted.

When the binary signal analysis circuit 16 receives a DIS (digital discrimination) signal through the signal line 14a, it supplies a pulse onto a signal line 16a. The circuit 16 also produces information of each of the 15th, 19th and 20th bits of an FIF (facsimile information field) of the signal DIS onto signal lines 16b, 16c, and 16d.

The 15th bit of the FIF of the signal DIS represents the reception image quality mode of the receiving end apparatus. When the 15th bit is "0", it means that the receiving end apparatus can receive only in the standard mode. When the 15th bit is "1", however, the receiving apparatus can receive in both the standard and fine (high image quality) modes.

The 20th bit of the FIF of the signal DIS represents the recording paper size of the receiving end apparatus. When the 20th bit is "1", it means that the receiving end apparatus has roll recording paper and the recording length is not limited. When the 20th bit is "0", it means the receiving end apparatus has a recording sheet of predetermined length. When the 20th bit is "0", the 19th bit becomes effective. When the 19th bit is "0", the maximum recording paper length is about the size of an A4 paper sheet (297 mm). When the 19th bit is "1", the maximum recording paper length is about the size of a B4 paper sheet (364 mm).

When the binary signal analysis circuit 16 receives a signal CFR (reception ready confirmation) or a signal MCF (message confirmation), it supplies a pulse onto a signal line 16e a signal line 16f, respectively. The signal lines 16a to 16f are connected to a control circuit 48.

The control circuit 48 consists of a microprocessor, a control memory and the like. In order to perform control operations to be described later, the control circuit 48 is connected to a counter circuit 18, an original size detector circuit 20, an original detector circuit 22, and an image quality mode detector circuit 24.

When a pulse is supplied onto a signal line 48a, the counter circuit 18 is cleared to 0. Every time a pulse is supplied onto a signal line 48b, the counter circuit 18 is incremented by one. The count of the counter circuit 18 is supplied to the control circuit 48 through a signal line 18a.

The original size detector circuit 20 comprises a known detector such as a photosensor or a microswitch. The circuit 20 detects the width of the original placed on an original table of a scanner section 26 so as to determine the original size. When the original is an A4 size original, the original size detector circuit 20 supplies a signal of level "0" onto a signal line 20a. When the original is a B4 size original, the circuit 20 supplies a signal of level "1" onto the signal line 20a.

The original detector circuit 22 similarly comprises a detector such as a photosensor or a microswitch. The circuit 22 detects if an original is present at the reading position of the scanner section 26 or at a position, a predetermined distance in front thereof. For example, when the circuit 22 detects an original at the reading position, it produces a signal of level "1" into a signal line 22a. When an original is not detected at the reading position, the circuit 22 produces a signal of level "0" onto the signal line 22a. Alternatively, for example when the circuit 22 detects an original at the position the predetermined distance in front of the reading position, it produces a signal of level "1" onto a signal line 22b. If not, it produces a signal of level "0" onto the signal line 22b.

The image quality mode detector circuit 24 detects the operating state of an image quality mode switch arranged on an operation panel or the like. When the standard mode is selected by the image quality mode switch, the circuit 24 produces a signal of level "1" onto a signal line 24a. When the fine mode is selected, the circuit 24 produces a signal of level "0" onto the signal line 24a.

The scanner section 26 comprises a photoelectric conversion element such as a CCD sensor and reads an image by a known method. More specifically, the scanner section 26 conveys an original while scanning an original image. During this scanning operation, the scanner section 26 reads image signals in units of main scanning lines and produces binary signal arrays onto a signal line 26a. When reading of one line is completed, the scanner section 26 generates a pulse onto a signal line 26b.

The image signal arrays on the signal line 26a are mixed with an image pattern generated by a pattern generator 28. The pattern generator 28 forms identification information indicating a page boundary when image signals are transmitted after being divided into portions corresponding to a plurality of recording paper sheets. The pattern generator 28 comprises, for example, a character generator. In this embodiment, the pattern generator 28 forms identification information in the form of image information of character strings and produces the information onto a signal line 28a.

A character string consists of 32 scanning lines in the standard mode and 64 scanning lines in the fine mode. In this case, when the scanning line density is assumed to be 3.85 line/mm, the width of each character string becomes about 8.3 mm and 16.6 mm in each mode. The standard or fine mode is designated from the control circuit 48 through signal lines 48d and 48e.

When a pulse is generated onto the signal line 48d, the pattern generator 28 receives a signal on the signal line 48e and reads information about the image quality mode. The signal line 48e is set at level "0" in the standard mode and at level "1" in the fine mode.

For each line of information output, the pattern generator 28 produces a pulse onto a signal line 28b. When all the pulses are produced, the pattern generator 28 generates a pulse onto a signal line 28c.

The image signal of the scanned original and image information of the identification information are added by an adder 30, and a sum result is supplied to an encoder 32 through a signal line 30a.

The encoder 32 operates in accordance with the MH (Modified Huffman) coding method as in Recommendation T4 of CCITT. The encoded result is supplied to a modulator 34 through a signal line 32a. The encoder 32 also generates an encoded procedure signal. When a pulse is received from the control circuit 48 through a signal line 48k, the encoder 32 produces a signal RTC (control return).

The modulator 34 performs phase modulation or quadrature modulation in accordance with a known method as in Recommendations V7ter to V29 of CCITT. The modulated result is supplied to an adder 46 through a signal line 34a.

The adder 46 is similar to one described above. The adder 46 adds transmission procedure signals supplied from the signal sending circuits to be described below through signal lines 36a, 38a, 40a, 42a, and 44a. The sum output from the adder 46 is supplied to the hybrid circuit 12.

When a pulse is supplied from the control circuit 48 through a signal line 48f, a DCS signal sending circuit 36 produces a signal DCS (digital instruction) onto a signal line 36a.

When a pulse is supplied from the control circuit 48 through a signal line 48g, a training/TCF signal sending circuit 38 produces a training/TCF (training check) signal onto a signal line 38a.

When a pulse is supplied, from the control circuit 48 through a signal line 48h, an MPS signal sending circuit 40 produces an MPS (multi-page) signal onto a signal line 40a.

When, a pulse is supplied from the control circuit 48 through a signal line 48i, an EOP signal sending circuit 42 produces an EOP signal onto a signal line 42a.

When a pulse is supplied from the control circuit 48 through a signal line 48j, a DCN signal sending circuit 44 produces a DCN (cutting command) signal onto a signal line 44a.

The control sequence of the control circuit 48 will briefly be described below. For the sake of simplicity, during the procedure, it is assumed that reception failure of a training signal or an image signal is not signalled from the receiving side by means of known procedure signals FTT, RTN, and RTP. It is also assumed that the telephone mode such as a telephone reservation mode is not adopted, and the communication mode is not changed from the sending side. It is finally assumed that the timings of various procedure signals are controlled as in conventional systems.

Before communication, the image receiving side sends a DIS signal. The control circuit 48 then checks an output from the binary signal analysis circuit 16 and obtains information about the recording paper length at the receiving side. If there is a maximum length, it is checked if such a maximum length corresponds to an A4 size or a B4 size. The control circuit 48 collates data of an image quality mode allowed in the sending side in the DIS signal with a desired image quality mode input through the image quality mode detector circuit 24 by the operator.

The control circuit 48 determines the maximum main scanning line number per recording paper sheet in accordance with the determined image quality mode and the maximum length of the recording paper sheet. The line number is stored in a predetermined area in a control memory (not shown). The area will be indicated with a label TLINE.

Each time the scanner section 26 reads one line, the control circuit 48 counts the number of processed lines using the counter circuit 18. The control circuit 48 encodes, modulates and transmits the image information. The count of the counter circuit 18 is compared with the number of lines in the area TLINE. When the count and the number of lines coincide and when there is still another original to be read, transmission is continued. When such divisional communication is performed, identification information formed by the pattern generator 28 is recorded at the beginning of the next recording paper sheet.

The control sequence of the control circuit 48 will be described in detail with reference to the flow charts shown in FIGS. 2A and 2B. In the example described, the control circuit 48 comprises a microprocessor. The control circuit 48 uses a B register as a flag indicating if the identification information is to be sent. A predetermined area of a memory can be used in place of the register. The same reference numerals in FIGS. 2A and 2B indicate that the flow is continuous at these places.

Figure 2A:
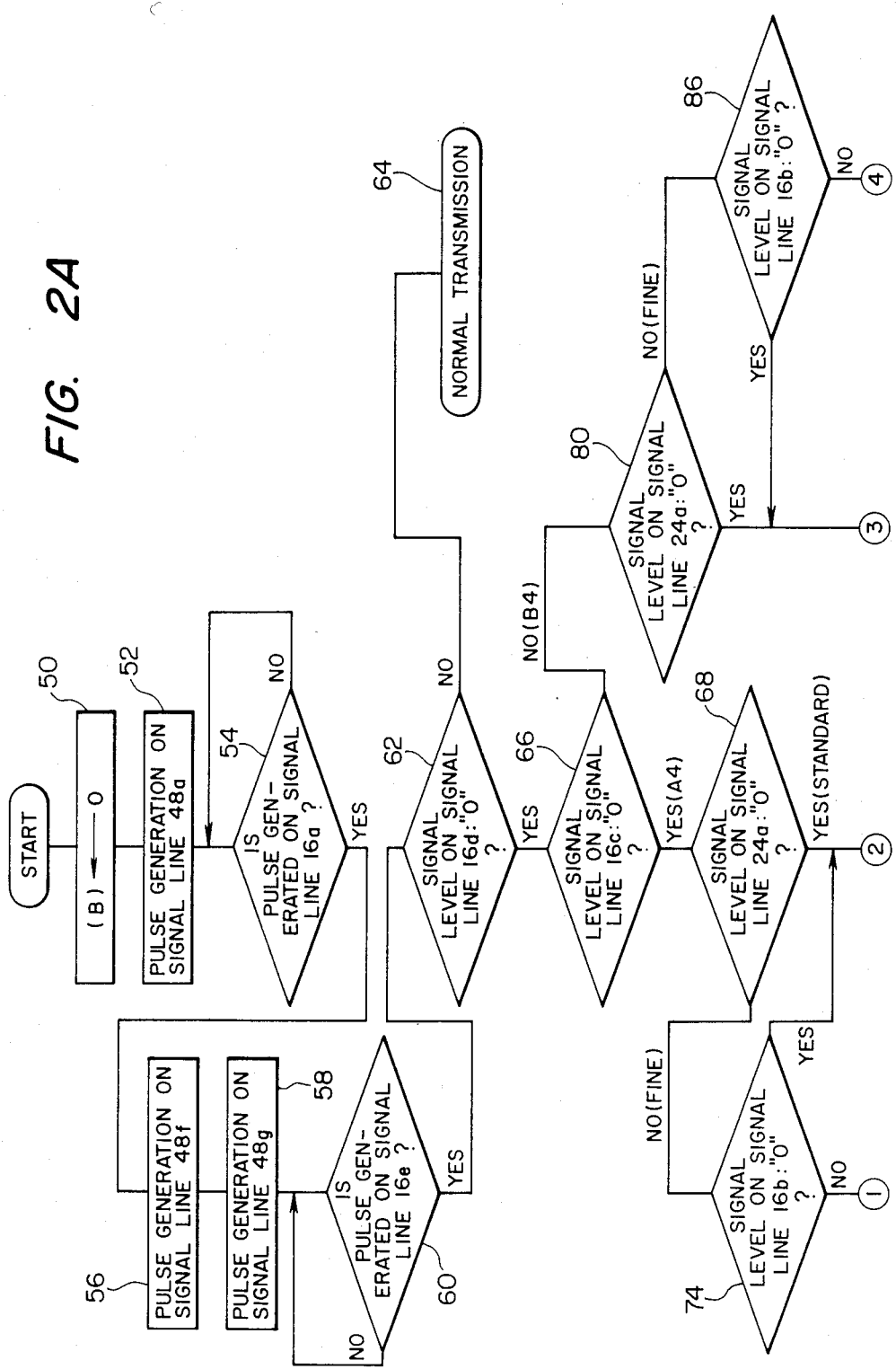
FIGS. 2A, 2B and 2C are flow charts showing the control sequence of the facsimile apparatus shown in FIG. 1.

In step 50 in FIG. 2A, the control circuit 48 stores "0" in the B register. This B register is used to switch if identification information representing divisional communication indicating that the current page is continued from the previous page, before image signals are transmitted. When "0" is set in the B register, identification information is not transmitted. If "0" is not stored in the B register, identification information representing that the current page is continued from the previous page is transmitted. For the first page, since such identification information need not be transmitted, "0" is set in the B register.

In step 52, the control circuit 48 generates a pulse onto the signal line 48a, i.e., clears the counter circuit 18.

In step 54, it is checked if a pulse is generated on the signal line 16a, i.e., if the DIS signal is received from the receiving side. If it is determined that a pulse is generated on the signal line 16a, i.e., if the DIS signal is received from the receiving side, the flow advances to step 56.

In step 56, a pulse is generated onto the signal line 48f, i.e., a DCS signal is sent in response to the received DIS signal.

In step 58, a pulse is generated onto the signal line 48g; a training/TCF signal is sent to perform a known training operation.

In step 60, it is checked if a pulse is generated on the signal line 16e, i.e., if a CFR signal is received from the receiving side. When a pulse is generated on the signal line 16e, i.e., if a CFR signal is received from the receiving side, the flow advances to step 62.

In step 62, it is checked if the signal level on the signal line 16d is "0", i.e., if the maximum recording paper length is present. When the signal on the signal line 16d is at level "0", i.e., if there is a maximum recording paper length, the flow advances to step 66. However, when the signal on the signal line 16d is at level "1", i.e., when the receiving side is using roll paper and the maximum length is not limited, the flow advances to step 64.

In step 64, image transmission as in conventional communication is performed. In this transmission operation, an elongated original image is not divided and is transmitted unmodified.

In step 66, it is checked if the signal on the signal line 16c is at level "0", i.e., if the maximum recording paper length corresponds to A4 size. When the signal on the signal line 16c is at level "0", i.e., when the maximum recording paper length is A4, the flow advances to step 68. When the signal on the signal line 16c is level "1", i.e., if the maximum recording paper length corresponds to B4 size, the flow advances to step 80.

In step 68, it is checked if the signal on the signal line 24a is "0", i.e., if the standard mode is selected. If the signal on the signal line 24a is at level "0", i.e., if the standard mode is selected by the operator, the flow advance to step 70. However, if the signal on the signal line 24a is at level "1", i.e., if the fine mode is selected, the flow advances to step 74.

In step 70, the number of lines (1143 lines) corresponding to the maximum recording paper length in the A4 standard mode is stored in the area TLINE.

In step 72, a signal of level "0" is generated onto the signal line 48e, indicating that the standard mode is selected.

In step 74, it is checked if the signal on the signal line 16b is at level "0", i.e., if the receiving side does not have the fine mode. When the signal on the signal line 16b is at level "0", i.e., if the receiving side cannot receive in the fine mode, the flow advances to step 70. When the level of the signal line 16b is at level "1", i.e. if the receiving side can receive in the fine mode, the flow advances to step 76.

In step 76, the number of lines (2287 lines) corresponding to the maximum recording paper length in the A4 fine mode is stored in the area TLINE.

In step 78, a signal of level "1" is supplied onto the signal line 48e, i.e., transmission in the fine mode is instructed to the pattern generator 28.

In step 80, it is checked if the signal on the signal line 24a is at level "0", i.e., if the standard mode is selected. If the signal on the signal line 24a is at level "0", i.e., if the standard mode is selected, the flow advances to step 82. If the signal on the signal line 24a is at level "1", i.e., if the fine mode is selected, the flow advances to step 86.

In step 82, the number of lines (1401 lines) corresponding to the maximum recording paper length is stored in the area TLINE.

In step 84, a signal of level "0" is supplied onto the signal line 48e so as to instruct the transmission in the standard mode to the pattern generator 28.

In step 86, it is checked if the signal on the signal line 16b is at level "0", i.e., if the receiving side does not have the fine mode. If the signal on the signal line 16b is at level "0", i.e., if the receiving side cannot receive in the fine mode, the flow advances to step 82. When the signal on the signal line 16b is at level "1" 1a if the receiving end can receive in the fine mode, the flow advances to step 88.

In step 88, the number of lines (2803 lines) corresponding to the maximum recording paper length in the B4 fine mode is stored in the memory area TLINE.

In step 90, a signal of level "1" is supplied onto the signal line 48e so as to instruct transmission in the fine mode to the pattern generator 28.

In step 92, it is checked if the value set in the B register is "0", i.e., if identification information indicating divisional communication is to be sent when image signals are sent. If the value set in the B register is "0", the flow advances to step 102. If not, the flow advances to step 94.

In step 94, a pulse is supplied onto the signal line 48d. That is, transmission of identification information indicating divisional communication is started.

In step 96, it is checked if a pulse if genrated onto the signal line 28b, i.e. if data of one line has been generated by the pattern generator 28. If a pulse is generated on the signal line 28b, the flow advances to step 98. When a pulse is not generated on the signal line 28b, the flow advances to step 100.

In step 98, a pulse is generated on the signal line 48b. That is, the counter circuit is incremented by one.

In step 100, it is checked if a pulse is generated onto the signal line 28c, i.e., if transmission of all the lines stored in the pattern generator 28 has been completed. If a pulse is generated on the signal line 28c, i.e., if transmission of signals has been completed, the flow advances to step 102. However, if a pulse is not generated on the signal line 28c, the flow advances to step 96.

Figure 2B:
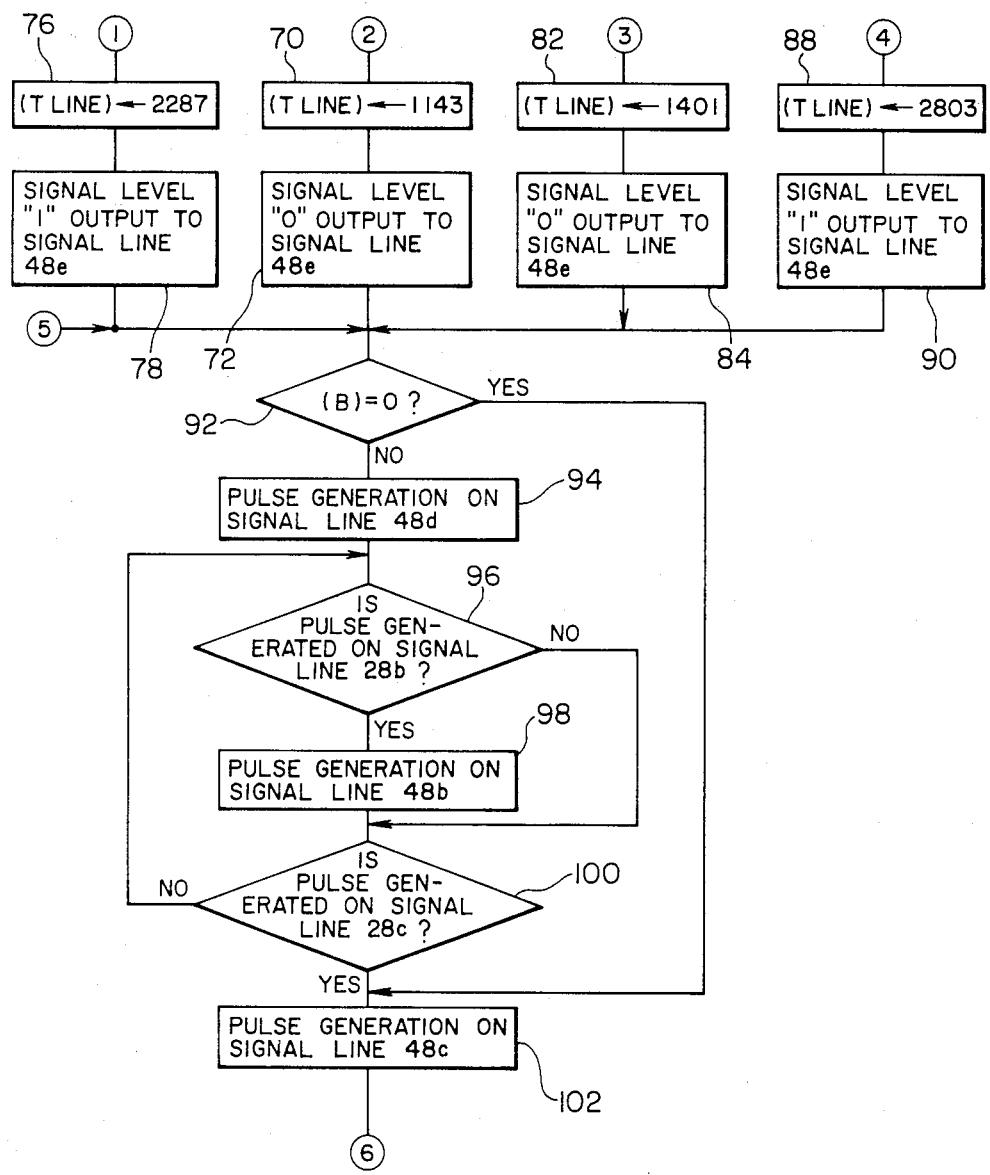
Figure 2C:
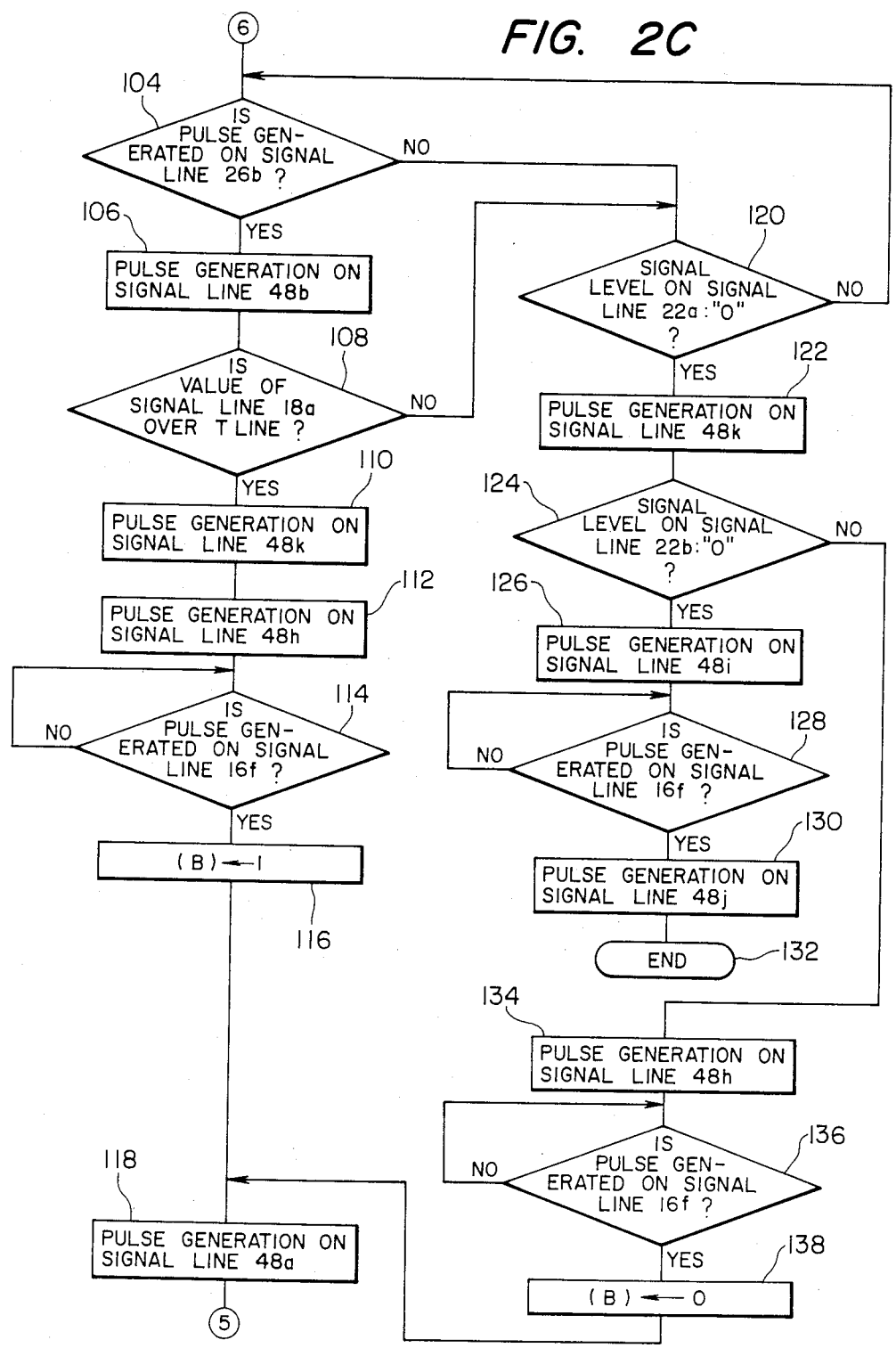

In step 102 in FIG. 2B, a pulse is generated on the signal line 48c, i.e., an image signal output from the scanner section 26 is started.

In step 104, it if checked is a pulse is generated on the signal line 26b, i.e., if image reading of one line by the scanner section 26 has been completed. If a pulse is generated on the signal line 26b, i.e., if reading of one line has been completed, the flow advances to step 106. If a pulse is not generated on the signal line 26b, i.e., if reading of one line has not been completed, the flow advances to step 120.

In step 106, a pulse is generated onto the signal line 48b, i.e., the counter circuit 18 is incremented by one.

In step 108, it is checked if the value on the signal line 18a has exceeded the value stored in the memory area TLINE, i.e., if the number of lines transmitted has exceeded the number of lines corresponding to the maximum recording paper length. When the value on the signal line 18a has reached the value of the area TLINE, the flow advances to step 110. If the value on the signal line 18a has not exceeded the value stored in the area TLINE, the flow advances to step 120.

In step 110, a pulse is generated onto the signal line 48k, i.e., an RTC signal for returning the procedure phase is transmitted to the receiving side.

In step 112, a pulse is generated onto the signal line 48h, i.e., an MPS signal representing transmission of a plurality of pages is transmitted.

In step 114, it is checked if a pulse generated onto the signal line 16f, i.e., if an MCF signal corresponding to the procedure signal is received from the receiving side. If a pulse is generated on the signal line 16f, i.e., if the MCF signal is received from the receiving side, the flow advances to step 116.

In step 116, "1" is stored in the B register, i.e., identification information indicating divisional communication is transmitted at the start of the next page.

In step 118, a pulse is generated onto the signal line 48a, i.e., the count of the counter circuit 18 is cleared.

In step 120, it is checked if the signal on the signal line 22a is at level "0", i.e., if an original is absent from the reading position. If the signal on the signal line 22a is at level "0", if an original is absent from the reading position, the flow advances to step 122. If the signal on the signal line 22a is at level "1", i.e., if an original is set at the reading position, the flow advances to step 104.

In step 122, a pulse is generated onto the signal line 48k, i.e., an RTC signal is sent so as to return to the procedure.

In step 124, it is checked if the signal on the signal line 22b is at level "0", i.e., if an original is absent from a position a predetermined distance in front of the reading position. If the signal on the signal line 22b is at level "0", i.e., if an original is absent from the position the predetermined distance in front of the reading position, the flow advances to step 126. If the signal on the signal line 22b is at level "1", i.e., if an original is present at the position the predetermined distance in front of the reading position, the flow advances to step 134.

In step 126, a pulse is generated onto the signal line 48i, i.e., an EOP signal indicating an end of image information is sent.

In step 128, it is checked if a pulse is generated on the signal line 16f, i.e., an MCF signal associated with a procedure signal is received from the sending side. If a pulse is generated onto the signal line 16f, i.e., if an MCF signal is received from the receiving side, the flow advances to step 130.

In step 130, a pulse, i.e., a DCN signal is generated onto the signal line 48j to disconnect the line, and communication is ended in step 132. In step 134, a pulse is generated on the signal line 48h, and an MPS signal representing transmission of a plurality of pages is supplied to the receiving side.

In step 136, it is checked if a pulse is generated on the signal line 16f, i.e., an MCF signal associated with a procedure signal is received from the receiving side. If a pulse is generated on the signal line 16f, i.e., if an MCF signal is received from the receiving side, the flow advances to step 138.

In step 138, "0" is stored in the B register. Since there is no more original, identification information is not sent at the start of the next page.

Figure 3A:
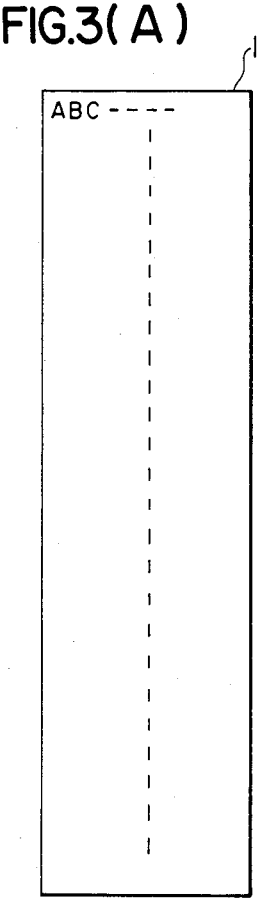
FIGS. 3A to 3C are representations showing the recorded states of recording sheets when information is recorded in a divided manner by the facsimile apparatus shown in FIG. 1.
Figure 3B:
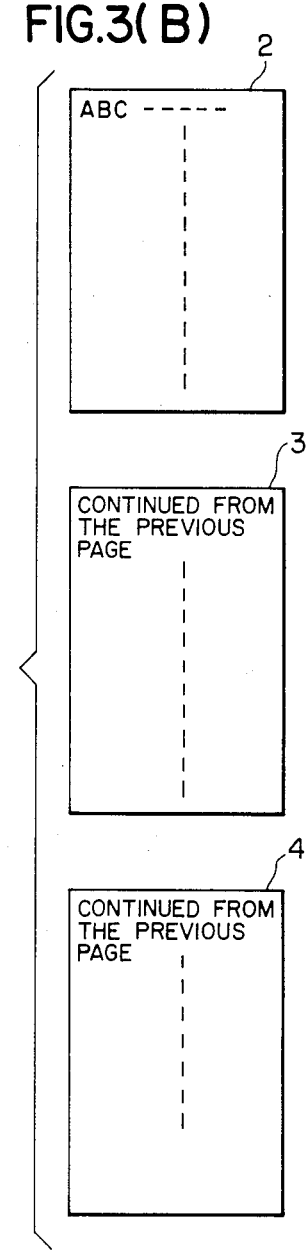
Figure 3C:
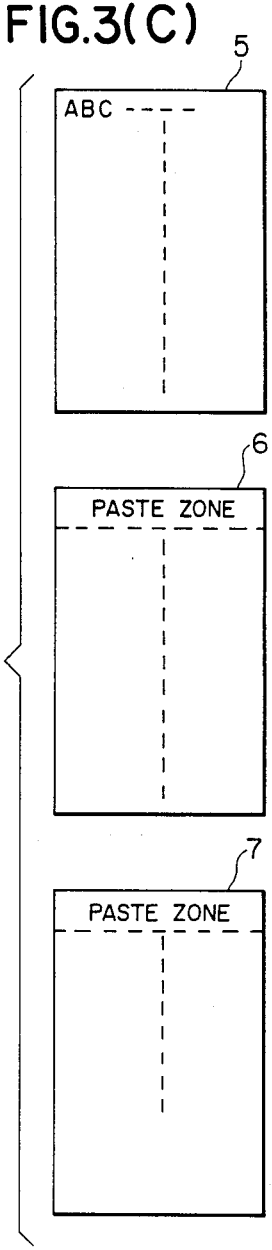

FIGS. 3A to 3C show states of facsimile communication according to this embodiment of the present invention.

Referring to FIG. 3A, an elongated original 1 does not have the standard format and has image information recorded on its overall surface. With the apparatus of the above configuration, when image information of such an elongated original is received, page change is performed in accordance with the size of the recording paper at the receiving side and the image quality mode selected, and divisional transmission of image information is performed. In this case, identification information such as a character string generated by the pattern generator 28 is recorded at a divided position on the recording paper. This character string can be arbitrarily preset or one of a plurality of character strings to be described later can be selected by the operator.

FIGS. 3B and 3C show examples of different character strings. In these figures, image information of the elongated original 1 is divided into 2 to 4 or 5 to 7 portions. In FIG. 3B, identification information, i.e., a character string "continued from the previous page" is recorded at the beginning of each recording paper sheet 3 or 4. In FIG. 3C, a character string, i.e., "paste zone38 is recorded with perforation.

FIGS. 3B and 3C illustrate an example wherein identification information is recorded at the start of each recording paper sheet. However, this identification information can be recorded at the end of each recording paper sheet.

In the above embodiment, when divisional transmission is performed, identification information, i.e., a character string representing divisional transmission is recorded at the beginning of the next page. Therefore, identification of recorded paper sheet is easy and recovery operation of original information can be performed easily. According to this embodiment, since identification information is sent as image information of a character string, the communication function at the receiving side is not limited. However, a pattern generator for generating identification information can be arranged at the receiving side, and the transmitting side can transmit only a predetermined signal for each new page.

In the above embodiment, divisional transmission is performed in accordance with the recording paper size at the receiving side. However, the above technique can be adopted when divisional communication of image information is performed for some other reason such as a memory overflow at the sending side.

If communication is in process when the remaining quantity of recording sheets has decreased to a predetermined quantity, transmission is interrupted and a message representing that communication is still in progress can be recorded on the remaining portion of recording paper. This will be described below.

Figure 4:
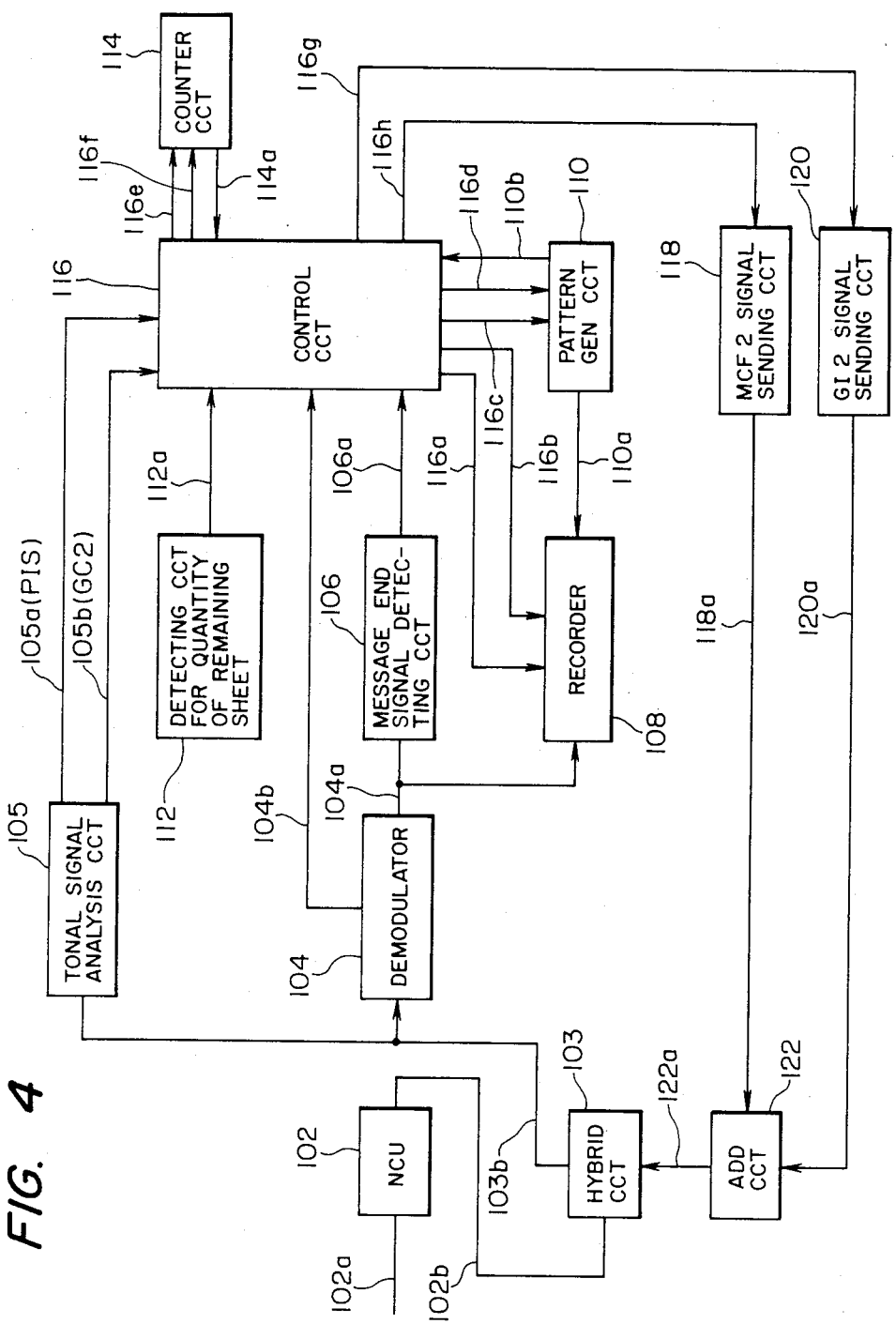
FIG. 4 is a block diagram showing the configuration of a facsimile apparatus according to another embodiment of the present invention.

FIG. 4 is a block diagram of a facsimile apparatus according to another embodiment of the present invention.

A G2 (Group 2) facsimile apparatus of CCITT will be exemplified.

Referring to FIG. 4, a known NCU (network control unit) 102 performs connection control of a telephone exchange network, loop holding, and switching between a telephone set and the facsimile apparatus. A telephone line 102a is connected to the input end of the NCU 102.

An output signal line 102b of the NCU 102 is connected to a hybrid circuit 103. The hybrid circuit 103 separates a transmission signal and a reception signal. In the reception mode, the hybrid circuit 103 produces onto a signal line 103b a signal received through the line 102a. In the transmission mode, the hybrid circuit 103 produces a signal received through a signal line 122a onto the line 102a through the NCU 103 via the signal line 102b.

The reception signal on the signal line 103b is supplied to a demodulator 104 and a tonal signal analysis circuit 105.

The demodulator 104 demodulates the reception signal in accordance with a predetermined scheme and produces a decoded signal to a message end signal detecting circuit 106 and a recorder 108 through a signal line 104a. The demodulator 104 generates a pulse onto the signal line 104b every time one line (scanning line) is demodulated.

The tonal signal analysis circuit 105 detects reception of at least a PIS signal (procedure interruption) signal and a GC2 (Group 2 Instruction) signal. The tonal signal analysis circuit 105 comprises a known tonal counter or the like. When a PIS signal is received, the circuit 105 generates a pulse onto a signal line 105a. When a GC2 signal is received, the circuit 105 generates a pulse onto a signal line 105b.

The message end signal detecting circuit 106 detects a demodulated EOM (End of Message Signal) signal (representing an end of transmission of one page data). When the circuit 106 detects an EOM signal, it generates a pulse onto the signal line 106a.

The recorder 108 comprises a known thermal printer or the like and records demodulated image information onto predetermined recording paper. More specifically, when a signal of level "1" is supplied through a signal line 116a, the recorder 108 records a signal on a signal line 110a. When a signal of level "0" is received through the signal line 116a, the recorder 108 records a signal on a signal line 104a. The recording operation of the recorder 108 is controlled in accordance with the state of a signal line 116b. That is, recording is performed in response to level "1" of the signal line 116b and recording is not performed in response to level "0" of the signal line 116b.

A pattern generator 110 comprising a character generator or the like produces different image information onto a signal line 110a when a pulse is generated onto a signal line 116c or 116d. When image information output is completed, the pattern generator 110 produces a pulse onto a signal line 110b.

Image information designated by the signal line 116c or 116d is a character string representing "The sending side is in the transmission mode of image information" or "The sending side is in the transmission mode of image information of the next page". However, this image information is not limited to a character string but can be a symbol or the like.

A transmission system circuitry includes an MCF2 signal sending circuit 118 and a GI2 signal sending circuit 120.

When a pulse is generated on a signal line 116h, the MCF2 signal sending circuit 118 generates an MCF2 (message confirmation) signal onto a signal line 188a. When a pulse is generated on the signal line 116g, the GI2 signal transmitting circuit 120 generates a GI2 (Group 2 Identification) signal onto a signal line 120a.

Transmission signals on the signal lines 118a and 120a are added by an adder 122, and the obtained sum is supplied to the hybrid circuit 103 through a signal line 122a.

A control circuit 116 comprises a microcomputer or the like. In order to perform control operations to be described later, the control circuit 16 is connected to a detecting circuit 112 for detecting the quantity of remaining sheets through a signal line 112a.

The detecting circuit 112 is a known detector. When the quantity of remaining sheets is more than a predetermined quantity a, the circuit 112 produces a signal of level "1" onto the signal line 112a. However, when the quantity of remaining sheets is less than the quantity at the circuit 112 produces a signal of level "0" onto the signal line 112a. The quantity a corresponds to, for example, a sum of the A4 size as the standard of G2 communication and a given length b. The given length b is a length sufficient for recording the image information generated by the pattern generator 110.

A counter circuit 114 is used to count the number of lines received. The count of the counter circuit 114 is cleared when a pulse is generated onto a signal line 116e. The counter circuit 114 counts the number of pulses generated onto the signal line 116f, and produces the count onto a signal line 114a.

The control circuit 116 performs the control operations to be described briefly.

When the quantity of remaining sheets is detected to be more than the predetermined quantity a, the reception operation as in a conventional apparatus is performed. When the quantity of remaining sheets is detected to have reached the predetermined quantity a, the counter circuit 114 counts the number of received lines. When the EOM2 signal is received before 1143 lines (the number of lines corresponding to the A4 size in the G2 mode) are received after starting counting, that is, when transmission of one page image information is completed, MCF2 and GI2 signals are transmitted. When the sending side has still more originals to send, the GC2 signal is transmitted but the signal CFR2 (reception preparation confirmation) signal is not transmitted. That is, reception of the image information of the next page is not allowed. Then, a pulse is generated onto the signal line 116d so as to produce a message "The sending side is going to transmit the next page" by the pattern generator 110. The message is recorded.

When the EOM2 signal is not received within 1143 lines after starting counting the number of lines, the recorder 108 is stopped through the signal line 116b and recording is interrupted. When the predetermined quantity a is determined as described above, since there is still more recording paper corresponding to the quantity b, a pulse is generated onto the signal line 116c. The pattern generator 116 generates a message "The sending side is in the transmission mode of image information". The message is recorded by the recorder 108.

The control sequence of the control circuit 116 will be described in detail with reference to the flow chart shown in FIG. 5. Since procedures starting from line connection to start of image reception are the same as conventional procedures, only the operation after image reception is started is described.

Figure 5A:
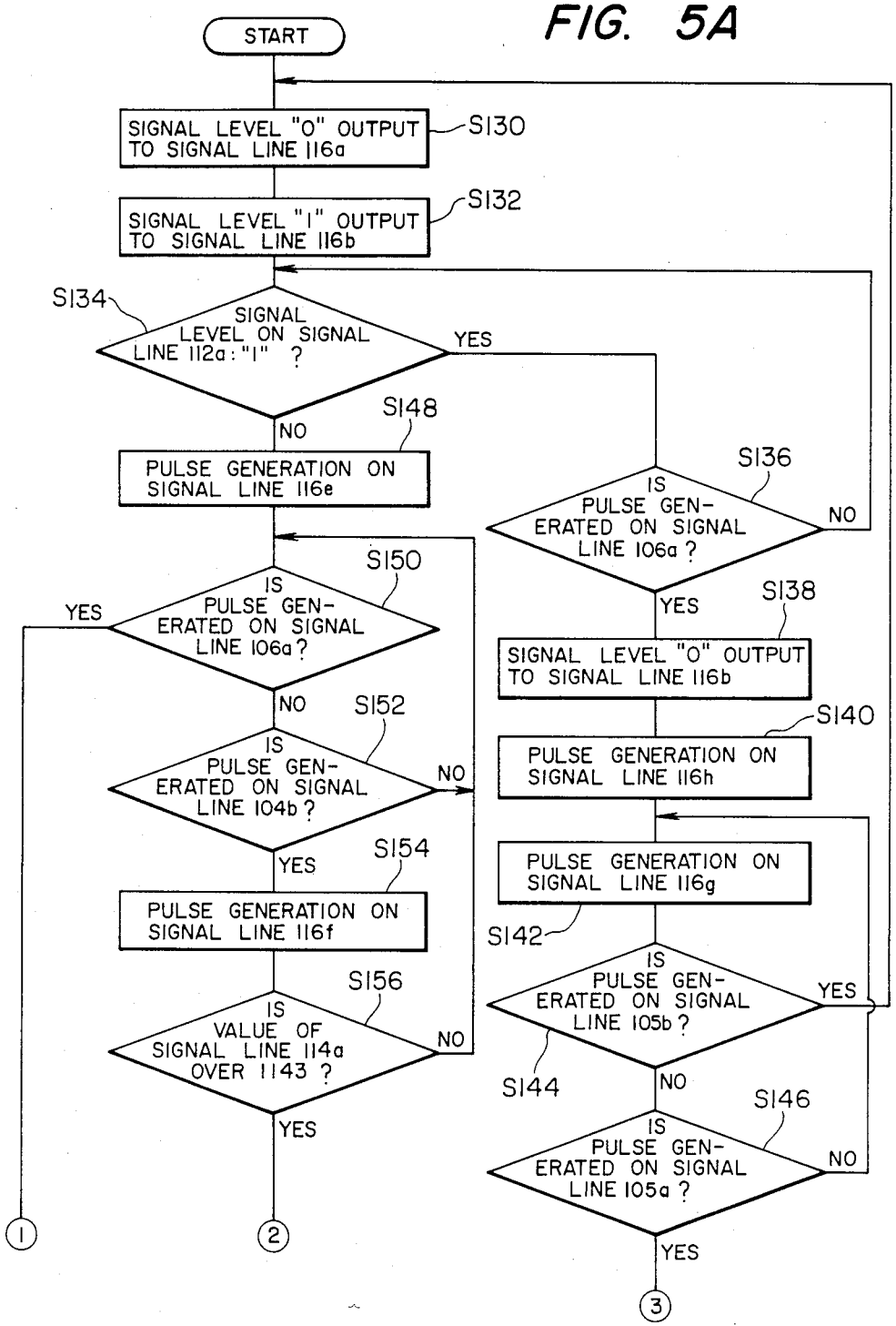
FIG. 5 composed of FIGS. 5A and 5B is a flow chart showing the control sequence of the facsimile apparatus shown in FIG. 4.
Figure 5B:
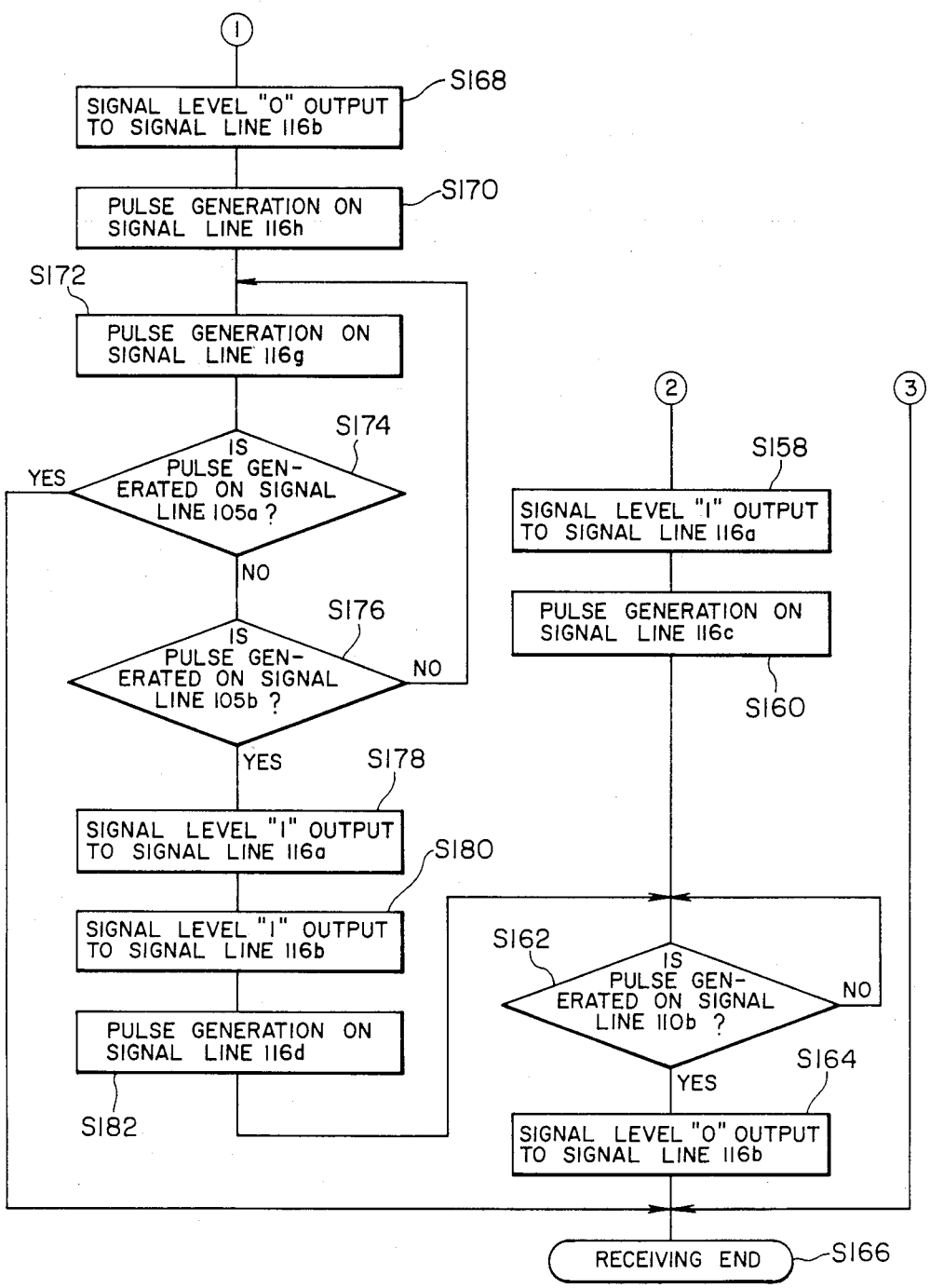

In step S130 in FIG. 5, the control circuit 116 generates a signal of level "0" onto the signal line 116a. The signal on the signal line 104a is supplied to the recorder 108 to allow image recording based on this signal.

In step S132, a signal of level "1" is supplied onto the signal line 116b to start recording.

In step S134, it is checked if the signal on the signal line 112a is at level "1". In other words, the output from the detecting circuit 112 is checked to determine if the quantity of remaining sheets is more than the predetermined quantity. If YES in step S134, the flow advances to step S136. However, if NO in step S134, the flow advances to step S148.

In step S136, it is checked if a pulse is generated on the signal line 106a, i.e., if the message end signal detecting circuit has detected an EOM signal. If YES in step S136, the flow advances to step S138. If NO in step S136, the flow returns to step S134.

In step S138, a signal of level "0" is generated on the signal line 116b to stop the recording operation of the recorder 108.

In step S140, a pulse is generated on the signal line 116h, and an MCF2 signal of G2 mode is generated by the MCF2 signal sending circuit 118. In step S142, a pulse is generated on the signal line 116g, and a GI2 signal is generated by the CI2 signal sending circuit 120 as in the above step. The above procedure signals are supplied to the telephone line through the adder 122, the hybrid circuit 103 and the NCU 102.

In step S144, it is checked if a pulse is generated on the signal line 105b. An output from the tonal signal analysis circuit 105 is checked to determine if a GC2 signal is received from the receiving side. If the GI2 signal is received, the flow returns to step S130. However, if the GC2 signal is not received, the flow proceeds to step S146.

In step S146, it is checked if a pulse is generated on the signal line 105a, i.e., if a PIS signal is received as in the above step. If the PIS signal is received, communication is ended in step S166. However, if the PIS signal is not received, the flow returns to step S142 and another GI2 signal is transmitted.

In step S148, a pulse is generated on the signal line 116e to reset the counter circuit 114.

In step S150, it is checked if an EOM signal is not received as in step S136. If the EOM signal is received, the flow advances to step S168. However, if the EOM signal is not received, the flow advances to step S152.

In step S152, it is checked if a pulse is generated on the signal line 104b, i.e., if demodulation of image information of one line by the demodulator 104 has been ended. If demodulation is ended, the flow advances to step S154. However, if demodulation is not ended, the flow returns to step S150.

In step S154, a pulse is generated on the signal line 116f, and the count of the counter circuit 114 is incremented by one.

In step S156, the count output on the signal line 114a is checked to determine if the count has exceeded 1143. If the count has exceeded 1143, the flow advances to step S158. However, if the count has not exceeded 1143, the flow returns to step S150.

In step S158, a signal of level "1" is generated on the signal line 116a so as to switch an input signal to the recorder 108 from the signal on the signal line 104a to the output from the pattern generator 110 on the signal line 110a.

In step S160, a pulse is generated on the signal line 116c to record character output image information representing "The sending side is in the transmission mode of image information" on the margin of the recorded A4 size paper sheet by the pattern generator 110.

In step S162, it is awaited until a pulse is generated on the signal line 110b, i.e., until image information output from the pattern generator 110 is ended. When image information output ends, the flow advances to step S164.

In step S164, a signal of level "0" is generated on the signal line 116b to stop the recording operation of the recorder 108 and communication is ended in step S166.

In step S168, the operation of the recorder 108 is stopped as in step S164.

In steps S170 and S172, the MCF2 and GI2 signals are generated as in steps S140 and S142.

In steps S174 and S176, reception of the PIS and GC2 signals is awaited as in steps S146 and S144. When the PIS signal is received, communication is ended in step S166. When the PIS signal is not received, the flow advances to step S178. When neither signal is received, the flow returns to step S172 and another GI2 signal is sent.

In step S178, a signal of level "1" is supplied onto the signal line 116a and an input to the recorder 108 is switched to the side of the signal line 110a.

In step S180, a signal of level "1" is generated on the signal line 116b to start recording image signals.

In step S182, a pulse is generated on the signal line 116d and character string image information "The sending side is going to transmit image information of the next page" is produced by the pattern generator 110. This image information is recorded by the recorded 108. Thereafter, the flow advances to step S162.

With the above control sequence, when the quantity of remaining recording sheets reaches a minimum quantity, a message "The receiving side was in the transmission mode", i.e., a message indicating that image communication has been interrupted in the middle of a single page is provided. When image reception is interrupted at a page boundary, a message "The sending side was going to send the next page", i.e., a message indicating that image communication has been interrupted at a page boundary is provided. Upon confirming such a message, the operator replenishes recording sheets and can ask the sending side to continue transmission of image information. In this manner, even when communication ends due to short supply of recording sheets at a page boundary or the like, the operator may not erroneously think that all the necessary image information has been received.

Messages may also include "No remaining sheet" or "Error end". Although the above embodiment is exemplified with reference to a case of a G2 facsimile apparatus, the present invention is similarly applicable to other types of apparatuses having different communication modes.

When the quantity of remaining recording sheets reaches the predetermined quantity, image information of the page being received can be stored in a memory, and at least this image information can be received without interruption.

FIG. 6 shows a block diagram of a facsimile apparatus for achieving this feature according to still another embodiment of the present invention.

Referring to FIG. 6, a network control unit (NCU) 202 performs connection control of a telephone exchange network by connection with its line 202a for data communication or the like, switching to a data communication path or loop holding. A signal received from a receiving side is supplied to a demodulator 204 through a signal line 202b.

A demodulator 204 receives a signal on a signal line 202b and demodulates in accordance with a scheme according to Recommendation V27ter or V29 or CCITT. Demodulation data from the demodulator 204 is supplied to a decoder 206 through a signal line 204a.

The decoder 206 receives a signal on the signal line 204a and decodes by the MH (Modified Huffman) decoding method or the MR (Modified Read) decoding method. The decoded data is supplied to circuits 208, 210 and 212 through a signal line 206a.

The RTC (control return) signal detecting circuit 208 receives a signal on a signal line 206a. When the circuit 208 detects the RTC signal on the signal line 206a, it produces a pulse to a control circuit 218 through a signal line 208a.

A recorder 210 receives data on the signal line 206a or data (data stored in an auxiliary memory) on a signal line 212a to be described later and records the received data. The recorder 210 can be a thermal printer, an ink-jet printer or the like. When the signal on a signal line 218a is set at level "0" by a control circuit 218, recording is not performed. When the signal on the signal line 218a is at level "1", recording is performed. When the signal on a signal line 218b is set at level "0" by the control circuit 218, data on the signal line 206a is recorded. When the signal on the signal line 218b is at level "1", data on the signal line 212a is recorded.

An auxiliary memory 212 stores information after shortage of recording sheets is detected. When the signal on a signal line 218c is at level "1", the auxiliary memory 212 receives data on the signal line 206a and stores it. When the signal on the signal line 218b is at level "1", the data stored in the memory 212 is transmitted on signal line 212a. When all the data stored in the auxiliary memory is transmitted on signal line 212a, the auxiliary memory 212 generates a pulse onto the signal line 212b.

A sheet detecting circuit 214 detects presence/absence of recording paper sheets. When there are recording paper sheets, the circuit 214 supplies a signal of level "1" to the control circuit 218. However, when there are no more recording sheets, the circuit 214 generates a signal of level "0". In this case, the recording paper can be either roll or cut paper.

A display circuit 216 displays if received data is stored in the auxiliary memory. When the signal on the signal line 218d is at level "0", the display circuit 216 displays "Received data is not stored in the memory". When the signal on the signal line 218d is at level "1", the display circuit 216 displays "Received data is stored in the memory". The display 216 can comprise an LCD or lamp circuit.

A button depression detecting circuit 220 detects depression of a recording start button at an operation panel having a known switch input circuit and the like. When the start button is depressed in order to start recording the received data stored in the auxiliary memory 212, the circuit 220 generates a pulse to the control circuit 218 through a signal line 220a.

The control circuit 218 comprises a known circuit consisting of a microcomputer, a control memory and the like and controls the overall apparatus in accordance with a predetermined program. During reception of information, the control circuit 218 checks an output from the sheet detecting circuit 214 so as to check the presence/absence of recording sheets. When shortage of recording sheets is detected, the display circuit 216 displays that received data is stored in the memory (due to shortage of recording sheets). The communication operation is interrupted at the currently recorded page, and the apparatus awaits an instruction from the operator. When the operator replenishes new recording sheets and depresses the start button again, the input from the start button is detected by the button depression detecting circuit 220. When a corresponding input is supplied to the control circuit 218, the control circuit 218 causes the recorder 210 to record the received data stored in the auxiliary memory 212.

The control sequence of the control circuit 218 will be described in detail with reference to FIG. 7.

Figure 7:
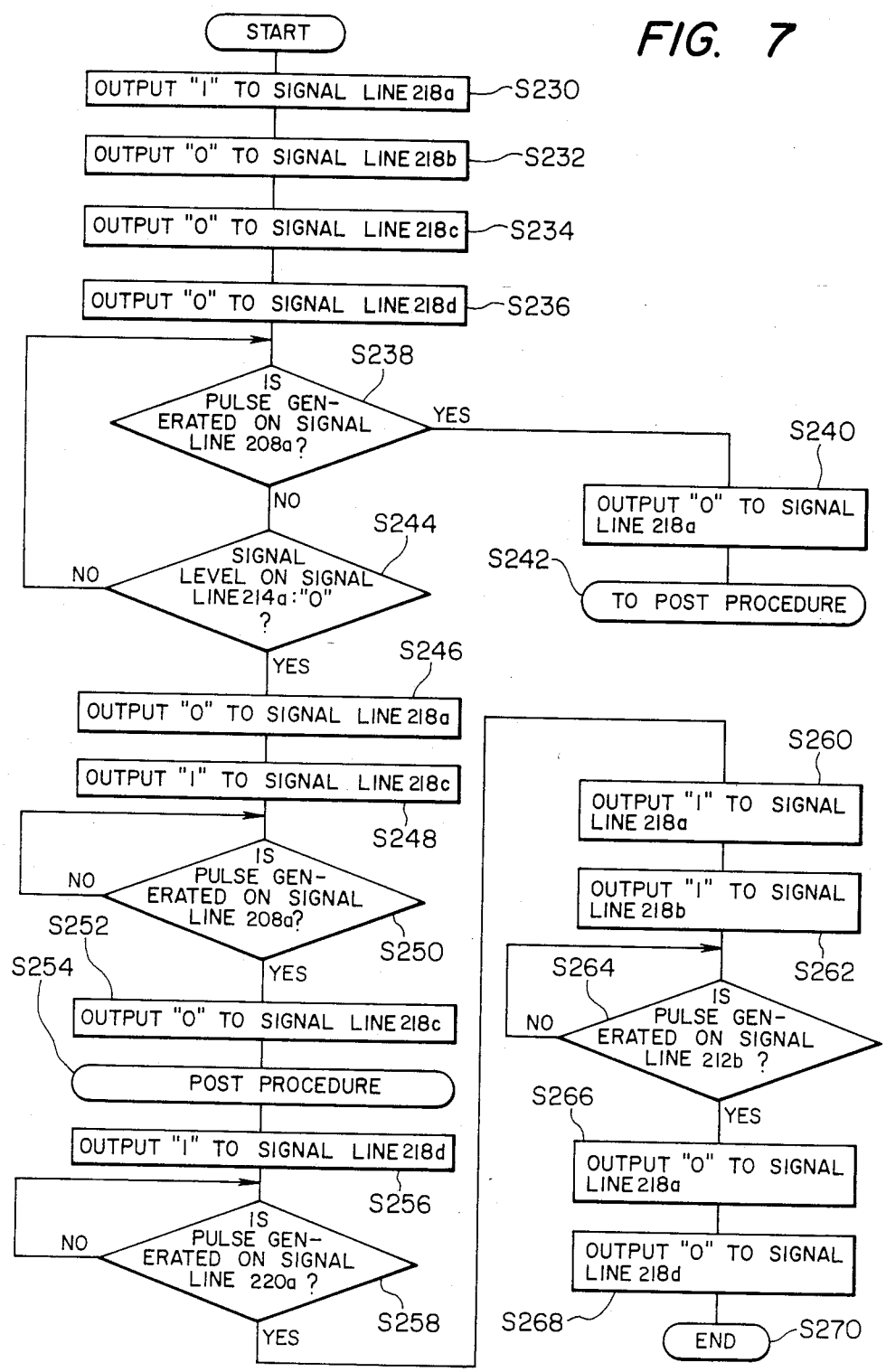
FIG. 7 is a flow chart showing the control sequence of the facsimile apparatus shown in FIG. 6.

FIG. 7 is a flow chart of the control sequence executed by the control circuit 218 shown in FIG. 6.

When the apparatus is set in the reception mode, after known communication procedures are performed, in step S230, the control circuit 218 generates a signal of level "1" onto the signal line 218a so as to allow recording of the received data by the recorder 108.

In step S232, a signal of level "1" is generated on the signal line 218b. Then, the recorder 210 selects and records the data on the signal line 206a.

In step S234, a signal of level "0" is generated on the signal line 218c so that the data on the signal line 206a will not be stored in the auxiliary memory 212.

In step S236, a signal of level "0" is generated on the signal line 218d so as to cause the display circuit 216 to display "The received data is not stored in the auxiliary memory".

In step S238, it is checked if a pulse is generated on the signal line 208a, i.e., if an RTC signal representing an end of image signals is detected. When a pulse on the signal line 208a is detected, i.e., the RTC signal is detected, the flow advances to step S240. When a pulse on the signal line 208a is not detected, i.e., the RTC signal is not detected, the flow advances to step S244.

In step S240, a signal of level "0" is generated on the signal line 218a to stop the recording operation of the recorder 210.

In step S242, known post procedures are performed to terminate communication.

However, if the RTC signal is not detected, it is checked in step S244 if the signal on the signal line 214a is at level "0", i.e., if there is no remaining recording sheets. If it is determined that the signal on the signal line 214a is at level "0", i.e., there is no recording sheets, the flow advances to step S246. If the signal on the signal line 214a is at level "1", i.e., if there are still recording sheets, the flow advances to step S238.

When there is no more recording sheets, in step S246, a signal of level "0" is generated onto the signal line 218a to stop the recording operation of the recorder 210.

In step S248, a signal of level "1" is generated onto the signal line 218c, i.e., the received data on the signal line 206a is stored in the auxiliary memory 212.

In step S250, it is checked if a pulse is generated on the signal line 208a, i.e., if the RTC signal is detected. If a pulse is generated on the signal line 208a, i.e., if an RTC signal is detected, the flow advances to step S252.

In step S252, a signal of level "0" is generated onto the signal line 218c so as not to allow the auxiliary memory to store the data on the signal line 206a.

In step S254, post procedures are performed.

In step S256, a signal of level "1" is generated onto the signal line 218d and the display circuit 216 displays "The received data is stored in the auxiliary memory".

In step S258, it is checked if a pulse is generated on the signal line 220a, i.e., if the recording start button has been depressed. If a pulse is generated on the signal line 220a, i.e., if the start button has been depressed, the flow advances to step S260.

In step S260, a signal of level "1" is generated on the signal line 218a, i.e., the recorder 210 is rendered operative.

In step S262, a signal of level "1" is generated on the signal line 218b, i.e. the data received from the signal line 210a (the data stored in the auxiliary memory 212) is selected and recorded by the recorder 210.

In step S264, it is checked if a pulse is generated on the signal line 212b, i.e., if the auxiliary memory 212 has transmitted all the stored data onto the signal line 212a. If a pulse is generated on the signal line 212b, i.e., if all the data stored in the auxiliary memory 212 is generated on the signal line 212b, i.e., if all the data stored in the auxiliary memory 212 is supplied onto the signal line 212a, the flow advances to step S266.

In step S266, a signal of level "0" is generated onto the signal line 218a to stop the recording operation of the recorder 210.

In step S268, a signal of level "0" is generated onto the signal line 218d, i.e., the display circuit 216 displays "The received data is not stored in the auxiliary memory". In step S270, the operation ends.

As described above, when short supply of recording sheets is detected, the recording operation is stopped and storage of received data in the auxiliary memory 212 is started. Therefore, the received data can be reproduced and the sending side operator need not retransmit the same information. Presence/absence only of recording sheets can be detected by a photointerruptor or the like. Therefore, an erroneous operation is prevented, and the circuit configuration can be simplified. It is to be noted that short supply of recording sheets is detected when there is a predetermined quantity of recording sheets still remaining.

In the above embodiments, when short supply of recording sheets is detected, the remaining data which must be sent is stored in an auxiliary memory. However, communication can be interrupted in accordance with the capacity of the memory, and data reception can be resumed after new recording sheets are replenished and recording the data stored in the memory. Furthermore, non-decoded data can be stored in the auxiliary memory 212 so as to effectively utilize the limited capacity of the memory.

In the above embodiments, a display circuit provides a character display. However, indication by a voice or lamp can be adopted.

Furthermore, the above embodiments are described with reference to facsimile apparatuses. However, the present invention is similarly applicable to other various types of recording apparatuses such as an ink-jet printer, a copier or a wire dot printer which uses fanfold paper as recording paper and is connected to a computer.

What is claimed is:

1. An image recording apparatus comprising:
   first recording means for recording an image on a recording medium in accordance with input image information;
   detecting means for detecting that a quantity of remaining recording medium has reached a predetermined quantity;
   control means responsive to an output from said detecting means for interrupting a recording operation of said first recording means according to the input image information; and
   second recording means for recording specific information on a recording medium, the specific information indicating that the recording operation of said first recording means according to the input image information is interrupted.

2. An apparatus according to claim 1, wherein said first recording means records image information transmitted from a sending apparatus by communication.

3. An apparatus according to claim 2, wherein when the remaining recording medium reaches a first predetermined quantity for recording the predetermined image information and transmission of image information from the sending apparatus has not been completed, the recording operation of said first recording means is immediately interrupted and said second recording means records image information representing that the sending apparatus has been set in a transmission mode.

4. An apparatus according to claim 3, wherein said second recording means records image information indicating that the sending apparatus was going to transmit image information of a succeeding page when transmission of a preceding page of image information from the sending apparatus ends and there is still more image information to be transmitted at the sending apparatus when a quantity of the remaining recording medium falls within a range between first and second predetermined quantities, the second predetermined quantity being a sum of the first predetermined quantity and a quantity of recording medium corresponding to one page of image information.

5. An apparatus according to claim 1, wherein said first and second recording means have a common recording unit, and said second recording means has output means for outputting said specific information to said common recording unit.

6. An image processing apparatus comprising:
   processing means for processing image information;
   detecting means for detecting that the image information subjected to processing by said processing means has reached a predetermined quantity;

control means for controlling said processing means to process the image information on a divisional basis in the event that image information remains to be processed when said detecting means detects that a predetermined quantity of image information has been processed; and output means for outputting top said processing means predetermined identification information indicating that the image information is processed being divided into a plurality of pages in the event that image information remains to be processed when said detecting means detects that a predetermined quantity of image information has been processed, wherein said output means outputs the predetermined identification information at the beginning of the page of which the remaining image information is processed.

7. An apparatus according to claim 6, wherein said processing means includes reading means for reading image information of an original document and transmission means for transmitting the image information read by said reading means.

8. An apparatus according to claim 7, wherein said processing means further includes receiving means for recording on a sheet of recording media and the predetermined quantity of image information is determined in accordance with information relating to the size of the recording sheet.

9. An apparatus according to claim 7, wherein the identification information is character information.

processing means for processing image information;

detecting means for detecting that the image information subjected to processing by said processing means has reached a predetermined quantity;

control means for controlling said processing means to process the image information on a divisional basis in the event that image information remains to be processed when said detecting means detects that a predetermined quantity of image information has been processed; and output means for outputting to said processing means predetermined identification information indicating that the image information is processed being divided into a plurality of pages in the event that image information remains to be processed when said detecting means detects that a predetermined quantity of image information has been processed, wherein said output means outputs the predetermined identification information at the beginning of the page of which the remaining image information is processed.

10. An image recording apparatus comprising:

recording means for recording on recording media in accordance with image information to be received;

detecting means for detecting that a remaining quantity of the recording media has reached a predetermined quantity;

memory means for storing the image information;

control means for controlling said memory means to store therein the image information in accordance with the output of said detecting means while the image information is being received; and output means for outputting a signal indicating that the image information has been stored in said memory means.

11. An image recording apparatus according to claim 10, wherein said apparatus further comprises display means for providing a display in response to the signal from said output means.

12. An image recording apparatus according to claim 11, further comprising instructing means for instructing the recording of the image information stored in said memory means, wherein said control means provides the image information from said memory to said recording means in response to the output of said instructing means.

13. An image recording apparatus according to claim 11, wherein said detecting means detects the presence or absence of the recording media.

* * * * *

UNITED STATES PATENT AND TRADEMARK OFFICE
CERTIFICATE OF CORRECTION

PATENT NO. : 4,717,967

DATED : January 5, 1988

INVENTOR(S) : TAKEHIRO YOSHIDA

It is certified that error appears in the above-identified patent and that said Letters Patent is hereby corrected as shown below:

AT [54] IN THE TITLE

"QUANITY" should read --QUANTITY--.

COLUMN 1

Line 3, QUANITY" should read --QUANTITY--.

COLUMN 2

Line 27, "erroenously" should read --erroneously--.

COLUMN 4

Line 43, "16e a" should read --16e or a--.

COLUMN 5

Line 1, "position," should read --position--.
    Line 4, "into" should read --onto--.
    Line 7, "example" should read --example,--.

COLUMN 6

Line 5, "V7ter" should read --V27ter--.
    Line 22, "supplied," should read --supplied--.
    Line 26, "When," should read --When--.

UNITED STATES PATENT AND TRADEMARK OFFICE
CERTIFICATE OF CORRECTION

PATENT NO. : 4,717,967

DATED : January 5, 1988

INVENTOR(S) : TAKEHIRO YOSHIDA

It is certified that error appears in the above-identified patent and that said Letters Patent is hereby corrected as shown below:

COLUMN 8

Line 3, "advance" should read --advances--.
Line 43, ""1" 1a" should read --"1", i.e.--.
Line 61, "if genrated" should read --is generated--.

COLUMN 9

Line 11, "if checked is" should read --is checked if--.

COLUMN 10

Line 48, ""paste zone38" should read --paste zone--.

COLUMN 12

Line 29, "16" should read --116--.
Line 36, "at" should read --a,--.

COLUMN 13

Line 10, "pattern generator 116" should read --pattern generator 110--.
Line 44, "CI2" should read --GI2--.

COLUMN 14

Line 52, "recorded" should read --recorder--.

UNITED STATES PATENT AND TRADEMARK OFFICE
CERTIFICATE OF CORRECTION

PATENT NO. : 4,717,967
DATED : January 5, 1988
INVENTOR(S) : TAKEHIRO YOSHIDA

It is certified that error appears in the above-identified patent and that said Letters Patent is hereby corrected as shown below:

COLUMN 15

Line 26, "or" (second occurrence) should read --of--.

COLUMN 16

Line 43, "recorder 108." should read --recorder 210.--.

COLUMN 19

Line 7, "top" should read --to--.
Lines 31-40 should be deleted.

COLUMN 20

Lines 1-11 should be deleted.

Signed and Sealed this

Twelfth Day of July, 1988

Attest:

DONALD J. QUIGG

*Attesting Officer*   *Commissioner of Patents and Trademarks*